United States Patent [19]
Goldstein et al.

[11] 3,786,757
[45] Jan. 22, 1974

[54] OPTICAL LENS ARRANGEMENT

[75] Inventors: Irving Goldstein; Gary G. Hayward, both of Lexington; Jon G. Holt, Woburn, all of Mass.

[73] Assignee: Raytheon Company, Lexington, Mass.

[22] Filed: June 22, 1972

[21] Appl. No.: 265,131

[52] U.S. Cl............................ 102/70.2 P, 244/3.16
[51] Int. Cl. ... F42c 13/02, F42c 13/00, F42c 19/00
[58] Field of Search.................. 102/70.2; 244/3.16

[56] References Cited
UNITED STATES PATENTS
3,239,674 3/1966 Aroyan........................... 102/70.2 P
3,129,424 4/1964 Rabinow........................ 102/70.2 P
3,034,436 5/1962 Arthaber et al................ 102/70.2 P

*Primary Examiner*—Samuel Feinberg
*Assistant Examiner*—Thomas H. Webb
*Attorney, Agent, or Firm*—Philip J. McFarland et al.

[57] ABSTRACT

An improved optical lens arrangement providing arming and detonating signals for a proximity fuse is shown. The illustrated lens arrangement includes a reflecting surface generally in the shape of a right circular cone, such surface effectively being faceted so that two conical detection fields are formed. Also disclosed are logic and control circuits for processing optical signals from targets in either or both detection fields to differentiate between true and spurious targets.

4 Claims, 4 Drawing Figures

OPTICAL LENS ARRANGEMENT

BACKGROUND OF THE INVENTION

This invention pertains generally to ordnance fusing apparatus and particularly to apparatus of such type incorporating an optical lens arrangement to generate a predetermined detection pattern.

It is known in the art that the detection pattern of an optical lens arrangement in ordnance fusing apparatus in an airborne vehicle, as a missile, may be made to cover 360° about the longitudinal axis of such vehicle. Thus, it is known that a stationary conical reflector and a convex lens may be combined to generate a hollow conical detection pattern around the longitudinal axis of an airborne vehicle. The shape of the detection pattern so generated is dependent on the apex angle of the stationary conical reflector. Such an optical lens arrangement may be used to focus optical energy (whether radiated directly from a target in the detection field or reflected from such a target) on a detector. The electrical signal out of the latter then may be processed to form an "arming" or "detonating" command signal for ordnance carried by the airborne vehicle.

While the just mentioned type of optical lens arrangement is relatively simple to build and efficient in operation in many applications, it does suffer some shortcomings. For example, because the presence of a target in the detection field results in either an "arming" or a "detonating" command signal, a choice must be made as to which command signal will be generated. If an "arming" command signal is chosen, then the necessary "detonating" command signal may not be generated at the optimum moment when the target is within the explosive field of the ordnance. On the other hand, if a "detonating" command signal is chosen, then the ordnance must, perforce, be armed before a target is detected. Such a condition, obviously, is to be avoided if possible to avoid the risk of premature detonation of the ordnance.

The risk of premature detonation is unacceptably high in the tactical situation in which a missile is fired to intercept a low-flying airborne target. In such a situation, the detection field may intercept a portion of the underlying terrain, thereby causing spurious optical signals to be detected so that a false "detonating" signal is generated. To avoid a false detonating signal, it is known to sense the Doppler velocities of desired targets and spurious targets, thereby differentiating between the two types of targets. Obviously, however, such an approach is relatively complex and expensive to implement.

SUMMARY OF THE INVENTION

With the aforementioned background of the invention in mind it is therefore a primary object of this invention to provide an improved optical lens arrangement for deriving "arming" and "detonating" command signals for ordnance carried in an airborne vehicle, as a missile.

Another object of this invention is to provide an improved optical lens arrangement for optical fusing apparatus, such arrangement being adapted to permit spurious optical signals from the terrain underlying an airborne vehicle to be differentiated from desired optical signals from an airborne target.

These and other objects of this invention are attained in an airborne vehicle, as a missile carrying a proximity fuse, by providing an optical lens arrangement having a reflecting detection field forming element which operates to produce a number (greater than one) of hollow conical detection fields and means for distinguishing between optical signals from targets in the various detection fields to generate desired "arming" and "detonating" command signals for ordnance carried by the airborne vehicle.

BRIEF DESCRIPTION OF THE DRAWINGS

For a more complete understanding of this invention, reference is now made to the accompanying description of the drawings, in which.

DESCRIPTION OF THE PREFERRED EMBODIMENTS

Figure 1:
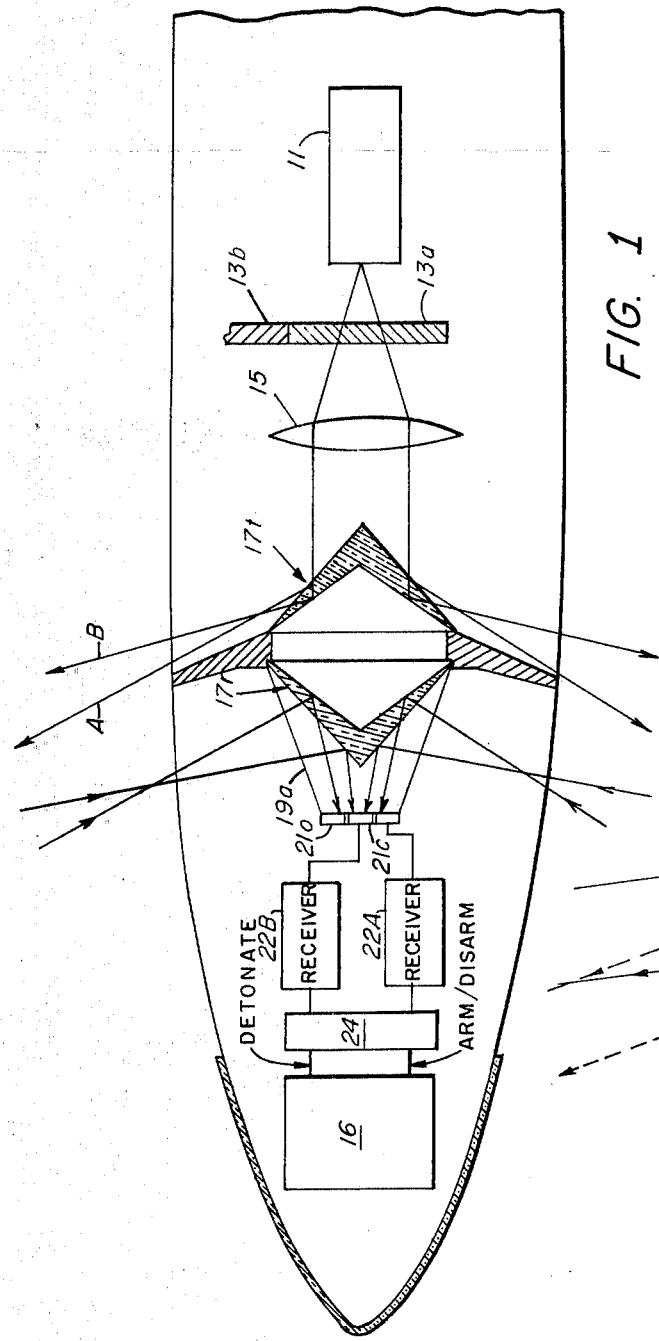
FIGS. 1 and 2 each is a simplified drawing illustrating the manner in which different optical lens arrangements according to this invention operate and the way in which optical signals from targets in the different detection fields may be processed.
Figure 4:
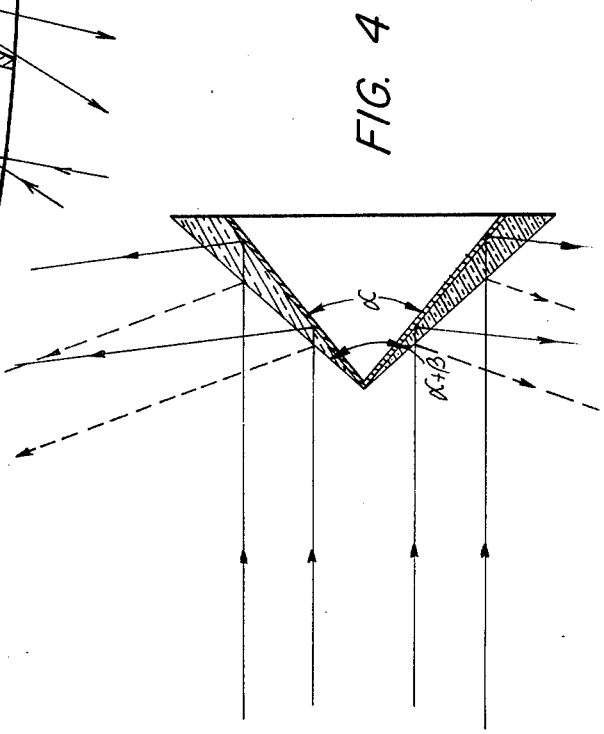
FIG. 4 is a cross-sectional view of a second preferred embodiment of this invention, such embodiment being particularly well adapted to use in an optical radar for arming and detonating ordnance in an airborne vehicle.

Referring now to FIG. 1, a double cone active fusing arrangement carried on an intercepting missile 10 may be seen to include a transmitter section and a receiver section. The former includes a laser 11 producing substantially unpolarized optical energy in a diverging beam. Such beam is passed through either one of a pair of orthogonal polarizers 13a, 13b, the particular one being moved into the beam in any convenient manner (not shown). The beam is then passed through a collimating lens 15 to fall on a conical reflector 17t. The details of the latter are shown in FIG. 4. Suffice it to say here that, depending upon which one of the polarizers 13a, 13b is in the beam from the laser 11, the optical energy reflected from the conical reflector 17t is directed into either one of two conical fields, A or B, outside the intercepting missile 10. In this connection it is noted that beam forming reflecting wedges, as described in our application entitled "Optical Fusing Arrangement" filed concurrently herewith, may be used between the conical reflector 17t and windows (not shown) in the skin of the intercepting missile.

A conical reflector 17r, similar to that shown in FIG. 4, is mounted in any convenient manner so that its base is parallel to the conical reflector 17t. Thus, optical energy originating in conical field A is reflected from the conical reflector 17t (after passing through a refractive cylinder 19a) to fall on an annular photodetector 21o and optical energy originating in conical field B is reflected to a central photodetector 21c. The photodectors 21o and 21c (corresponding, respectively, to photodetectors 21d, 21a in FIG. 2) are connected to receivers 22a, 22b and control unit 24. The details of one form of each of the just-mentioned parts of the system are shown in block form in FIG. 2. Another form of receiver and control unit is shown in our application Ser.

No. 265,130 entitled "Optical Fusing Arrangement" filed concurrently herewith. Suffice it to say here that a target in the conical field A causes the ordnance 16 to be armed and relative movement between the intercepting missile 10 and the target within a predetermined period of time causes the ordnance 16 to be detonated.

Figure 2:
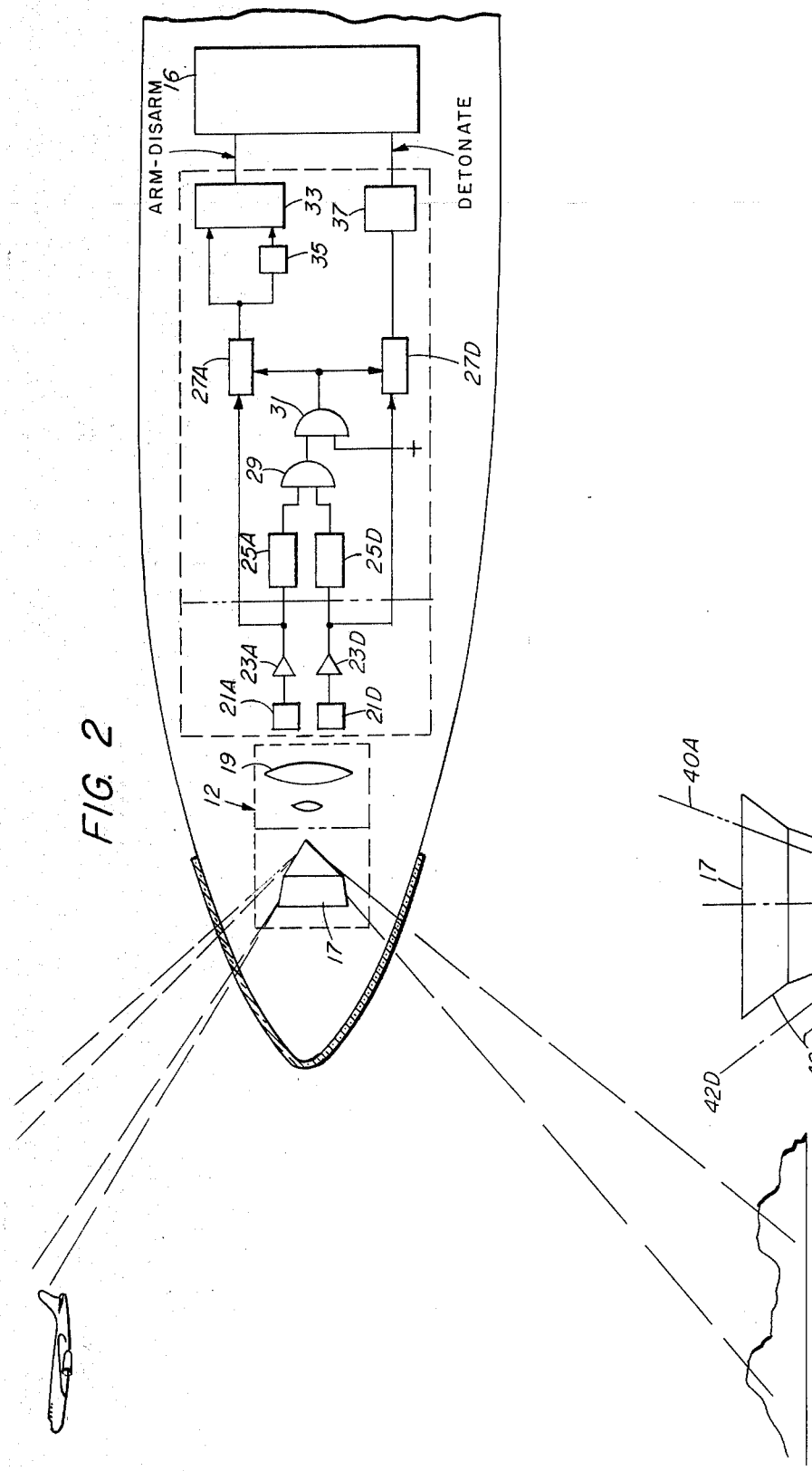

Referring now to FIG. 2, a missile 10 is shown in flight toward a target over underlying terrain (not numbered). As is known in the art, the missile 10 may be directed by any convenient means (not shown) to approach the target 11. The target here is assumed to be a jet aircraft. An optical lens arrangement 12 actuates a logic and control section 14 thereby to arm and detonate ordnance 16 when the target passes through detection fields A and D.

The optical lens arrangement 12 consists of a detection field forming element 17 (an embodiment of which is shown in more detail in FIG. 2) mounted in any convenient way so as to produce the hollow conical detection fields A and D aligned with the longitudinal axis (not numbered) of the missile 10. Optical energy from any target within detection field A is focused by a lens 19 on optical detector 21a and optical energy from any target within detection field D is focused on optical detector 21d in the control section 14. The lens 19 may consist of a doublet of lens elements for optical energy from targets within detection field D and a single lens for optical energy from targets within detection field A. Optical detectors 21a, 21d may be conventional photodetectors. Each one of the detectors 21a, 21d is connected to an amplifier 23a, 23d as shown. The output of each one of the latter is fed, respectively, to an integrator 25a, 25d and a second detector 27a, 27d.

It may be seen, therefore, that the second detectors 27a, 27d may be biased so as to be insensitive to optical signals received simultaneously from targets within both detection fields A and D. On the other hand, the second detectors 27a, 27d may be biased so as to be responsive to optical signals received from a target which is within one or the other detection fields A and D. To provide the variable bias for the second detectors 27a, 27d, the output of each one of the integrators 25a, 25d is fed to an AND gate 29, thereby enabling an AND gate 31 when signals appear simultaneously at the output of the integrators 25a, 25d. The second input to the AND gate 31 is a biasing voltage from any convenient source. It will now become obvious that, if the missile 10 is oriented in such a manner that both of the detection fields A and D fall on the underlying terrain, optical signals from points on the terrain will ultimately cause the AND gate 31 to be enabled, thereby shifting the detection level of the second detectors 27a, 27d to render them insensitive. When, however, the missile 10 moves so that the target is in detection field A, second detector 27a will produce an output signal. Such output then is fed to a controller 33 and to a delay unit 35, here a conventional unistable multivibrator. The controller 33 may take any convenient form as, for example, a push-pull amplifier to actuate the field coil of a solenoid (not shown) to "arm" the ordnance 16. At the same time, the unistable multivibrator 35 is caused to be driven to its state of unstable equilibrium. After a period of time (determined by the length of time unistable vibrator 35 remains in its state of unstable equilibrium) the controller 33 produces a "disarming" signal. It follows that, if the length of time the unistable multivibrator 35 remains in its state of unstable equilibrium is adjusted to be slightly longer than the greatest length of time required for any target to pass from detection field A to detection field D, the ordnance 16 may be armed only during the period in which it may effectively be detonated. In the illustrated situation, as the missile 10 approaches the target, the latter is located first in the detection field A and then in the detection field D while the ordnance 16 is armed. When the target appears in detection field D, detector 21d is actuated, thereby producing a signal which passes through amplifier 23d to the second detector 27d. The latter then produces an actuating signal for a controller 37 (similar to controller 33) to detonate the ordnance 16.

The foregoing description of two detection systems will make it apparent that the disclosed invention makes it possible to cancel out spurious signals from the underlying terrain, thereby eliminating one possibility of premature detonation of the ordnance 16. Further, the disclosed invention permits the ordnance 16 to be armed only when an airborne target is within or close to the explosive field of such ordnance.

Figure 3:
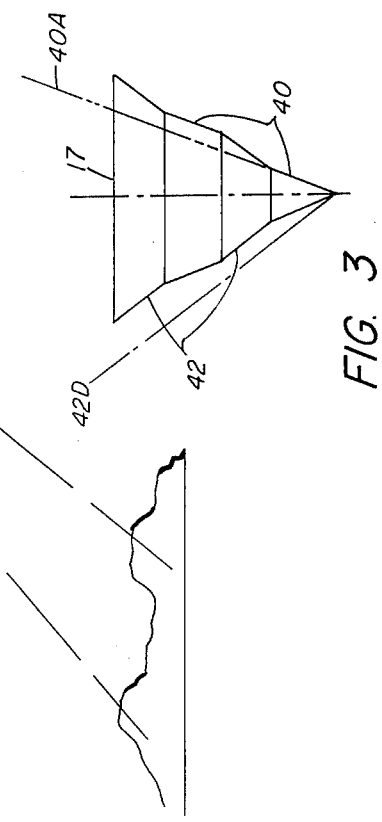
FIG. 3 is a cross-sectional view of one preferred embodiment of a reflecting detection field forming element, such embodiment being particularly well adapted for use in a passive system in which optical energy emitted by targets initiates operation.

Referring now to FIG. 3, it may be seen that the detection field forming element may consist of a generally conical reflector having two sets of zones formed therein. The inclination of one of the sets of zones, as zones 40, to the longitudinal centerline of the missile 10 corresponds to the inclination of a right circular cone 40a and the inclination of each one of the zones in the second set, as zones 42, corresponds to the inclination of a second right circular cone 42d. The apex angles of the right circular cones 40a, 42d then determine the detection fields A and D.

Referring now to FIG. 4, an alternative form of optical lens arrangement 12 for use in an active system is shown. Thus, lasers 50, 52 are disposed to project beams through, respectively, a polarizer 54 and a polarizer 56 to a collimating lens 58 and thence to a detector field forming element 60. The latter here has two reflective surfaces, the first being the surface of a right circular cone 62, fabricated from a material as aluminum, and the second being a dielectric coating 66 on the surface of a glass covering 64 on the right circular cone 62. Each polarizer 54, 56 is linearly polarized, with direction of polarization of the two being orthogonal to one another. The dielectric coating 66 is one which reflects light with a polarization corresponding to the polarization of light out of one of the polarizers 54, 56 and transmits light with the polarization of light out of the other polarizer 56.

It may be seen, therefore, that light from, say, laser 50 (after being collimated in the collimating lens 58) is reflected from the dielectric coating 66 to form a detection field which corresponds to detection field A (FIG. 1) and light from laser 52 is reflected from the surface of the cone 62 to form a detection field corresponding to detection field D. The lasers 50, 52 may be actuated in any convenient way (not shown) to produce either continuous beams or pulses of optical energy. In the latter case, of course, range to a target in either beam may be determined. Energy reflected from a target, is passed through the collimating lens 58 to either detector 21a or 21d. At the same time, energy reflected from the underlying terrain may be passed to both detectors as before. It is apparent, therefore, a logic and control section 14 similar to that in FIG. 1 may be connected to the detectors 21a, 21d to produce arming and detonating signals.

Having described preferred embodiments of the invention, it will now become clear that many changes may be made without departing from our inventive concepts. For example, it will be evident to one of skill in the art that the two separate optical detectors may be replaced by a single detector with a shutter mechanism and an appropriate switching arrangement to permit alternative processing of optical signals from the detection fields. It is felt, therefore, that this invention should not be restricted to its disclosed embodiments but rather should be limited only by the spirit and scope of the appended claims.

What is claimed is:

1. In a missile incorporating a proximity fuse to control the detonation of ordnance carried by such missile, such fuse including a photodetector means responsive to optical energy received from an airborne target, the improvement comprising:
   a. optical detection field forming means, such means including a first conical reflecting surface for defining, about an axis of symmetry, a first hollow conical detection field and a second conical reflecting surface for defining a second conical detection field within the first hollow conical detection field;
   b. means, responsive to optical energy reflected from the first and the second conical reflecting surfaces, for focusing such energy on the photodetector means to produce, respectively, a first and a second electric signal; and
   c. logic means, responsive to the first electric signal, for producing an arming signal for the proximity fuse and responsive to the second electric signal for producing a detonating signal for the proximity fuse.

2. The proximity fuse as in claim 1 wherein the first conical reflecting surface is a metallic mirror and the second conical reflecting surface is a dielectric mirror overlying the first conical reflecting surface, such dielectric mirror being opaque to optical energy having a first polarization.

3. The proximity fuse as in claim 1 wherein the apex angle of the first conical reflecting surface differs from the apex angle of the second conical reflecting surface.

4. The proximity fuse as in claim 3 wherein the logic means includes means for inhibiting production of an arming and a detonating signal in response to optical energy received simultaneously from the first and the second detection field.

* * * * *